US005467850A

United States Patent [19]

Skalski

[11] Patent Number: 5,467,850

[45] Date of Patent: Nov. 21, 1995

[54] PERMANENT MAGNET, MAGNETODYNAMIC SAFETY BRAKE FOR ELEVATORS AND THE LIKE

[75] Inventor: Clement A. Skalski, Avon, Conn.

[73] Assignee: Otis Elevator Company, Farmington, Conn.

[21] Appl. No.: 168,567

[22] Filed: Dec. 16, 1993

[51] Int. Cl.$^6$ .......... B60L 7/28

[52] U.S. Cl. .......... 188/165; 187/373

[58] Field of Search .......... 188/161, 164, 188/165, 189; 310/105; 187/359, 361, 365, 373, 374, 371, 376

[56] References Cited

U.S. PATENT DOCUMENTS

| | | | |
|---|---|---|---|
| 3,488,535 | 1/1970 | Baermann | 310/105 |
| 3,799,298 | 3/1974 | Loomer | 188/189 |
| 4,482,034 | 11/1984 | Baermann | 188/165 |
| 5,018,605 | 5/1991 | Hooghiem et al. | 188/165 |
| 5,140,208 | 8/1992 | Tozoni | 310/12 |
| 5,301,773 | 4/1994 | Jamieson et al. | 188/189 |

FOREIGN PATENT DOCUMENTS

| | | | |
|---|---|---|---|
| 198255 | 4/1907 | Germany . | |
| 903477 | 8/1962 | United Kingdom | 188/165 |

OTHER PUBLICATIONS

"Eddy Current Brake WSB", Knorr–Bremse GmbH, 1975.

*Primary Examiner*—Robert J. Oberleitner
*Assistant Examiner*—Chris Schwartz

[57] ABSTRACT

A safety brake (14) for an elevator (or other) car has a plurality of permanent magnets (21, 23) arranged along the car guide rail (13) with alternate magnets disposed with opposite polar orientation so as to provide loops of flux (23) between the magnets and in the guide rail when the brake is actuated. A pawl (27) engages a latch (30) to retain the brake lifted when not in use; a governor operated safety rod (34) rotates the pawl to disengage the latch for actuation of the brake in an emergency. Guides (55–59) stabilize the brake against the braking forces. A jack screw (49) overcomes attractive magnetic forces to reset the brake into the lifted position.

11 Claims, 5 Drawing Sheets

PERMANENT MAGNET, MAGNETODYNAMIC SAFETY BRAKE FOR ELEVATORS AND THE LIKE

TECHNICAL FIELD

This invention relates to a permanent magnet, safety brake which provides frictional and magnetodynamic braking, which is disclosed as an elevator safety brake but which may also be used on other cars that run on or are guided by a guide rail (trams, air effect machines, etc.).

BACKGROUND ART

Elevator systems are typically guided between a pair of ferrous rails, such as steel, which are also used as braking surfaces for emergency stops. In normal operation, all of the motion of the elevator and all of the arresting of that motion is caused by the hoist ropes, which are moved upwardly and downwardly, or held in a fixed position by means of a sheave, the motion of the sheave being controlled by the elevator drive motor and the machine brake which are mechanically coupled to the sheave. Machine brakes typically are spring actuated into the braking position against a drum or a disk attached to the sheave, and use electromagnets to release the brakes from the braking position when the elevator is to move. This provides fail-safe braking insofar as electrical power or electronic signaling is concerned.

A governor rope is attached to the elevator and rotates a governor, at a rate of rotary speed that relates to the elevator's linear speed, which has fly weights that move outwardly with increasing speed as a result of centrifugal force. When the elevator exceeds its rated speed (sometimes called "contract speed") by some small percent, the fly weights will be limited sufficiently outward to trip an overspeed switch and release a latch which allows a jaw to grip the governor rope and arrest its motion. The arrested governor rope causes actuators to pull safety rods on the elevator car causing the operation of safety brakes (sometimes called "safeties"), which are typically wedges that become jammed between a safety block and opposite sides of the elevator guide rail causing an increasing frictional force which abruptly stops the elevator.

A 1907 German patent, No. 198,255, suggested using electromagnets as an elevator safety brake, which would engage as a result of cable breakage, slackening of cable tension or exceeding determined speeds. Braking action is due both to mechanical friction and electromotive force generated in the car's guidance rail. A battery is used, and the operational capability of the system is tested with a switch each time that the elevator comes to rest. Similar eddy current braking systems have been devised for railroad trains, one example of which is shown in a pamphlet entitled "Eddy Current Brake WSB", published by Knorr-Bremse GMBH, 1975. The system described therein has electromagnets of alternating polar orientation dispersed above a length of track, on a carrier which hangs directly from the railway car truck. The magnets are kept suspended away from the rails by pneumatic cylinders except when emergency braking is desired; then, the air pressure is released so that the brake can drop down on the rail, thereby providing frictional braking action as a consequence of the electromagnetic attraction of the electromagnets to the rail, as well as magnetodynamic braking as a consequence of eddy currents induced by the alternating magnetic poles traversing the material of the track.

The safety codes which are imposed by a variety of governments frequently require that all safety devices must be fail-safe, that is, operative without electrical current and in the absence of electrical signals. This would render the use of electromagnets for an eddy current safety brake inadequate under such codes. Additionally, some codes require that safeties (such as the upwardly-pulled wedges referred to hereinbefore) be bi-directional, thereby capable of arresting run away upward motion as well as runaway downward motion of an elevator car.

DISCLOSURE OF INVENTION

Objects of the invention include providing a magnetodynamic elevator safety which will meet the bi-directional and fail-safe requirements of safety codes.

According to the present invention, a passive magnetodynamic car safety brake comprises an elongated yoke having a plurality of permanent magnets disposed thereon with alternate magnetic polarity. In accordance further with the invention, the magnets have flux-concentrating pole pieces disposed thereon. In further accord with the invention, the magnets may comprise neodymium iron, samarium cobalt, or barium ferrite. In accordance still further with the invention, a magnetodynamic safety elevator brake may be operated by motion of safety rods which are currently in use.

By means of safety rods which are pulled in response to governor overspeed in either direction, a single, simple brake 'shoe arrangement can provide safety braking action for either direction of travel. The present invention, while arresting the motion of the car, creates essentially no lateral force whatsoever so that safety brakes in accordance with the invention need not be used in pairs on opposite sides of the rails. This renders the present invention highly suitable for use on V-shaped tracks as well as on the V-portion of Y-shaped tracks. This feature also allows placing the safety brakes of the present invention in a dispersed manner, rather than having to concentrate the operation at a specific point, as in the case of wedge-action safety brakes. The use of magnetodynamics to assist in stopping an elevator in an emergency situation results in equivalent stopping force with less wear and tear both on the elevator guide rail and on the brake surfaces themselves. The invention may be used on cars other than elevators that travel along magnetic, conductive guide rails, such as trams and the like, and may be engaged in response to emergencies other than overspeeding.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
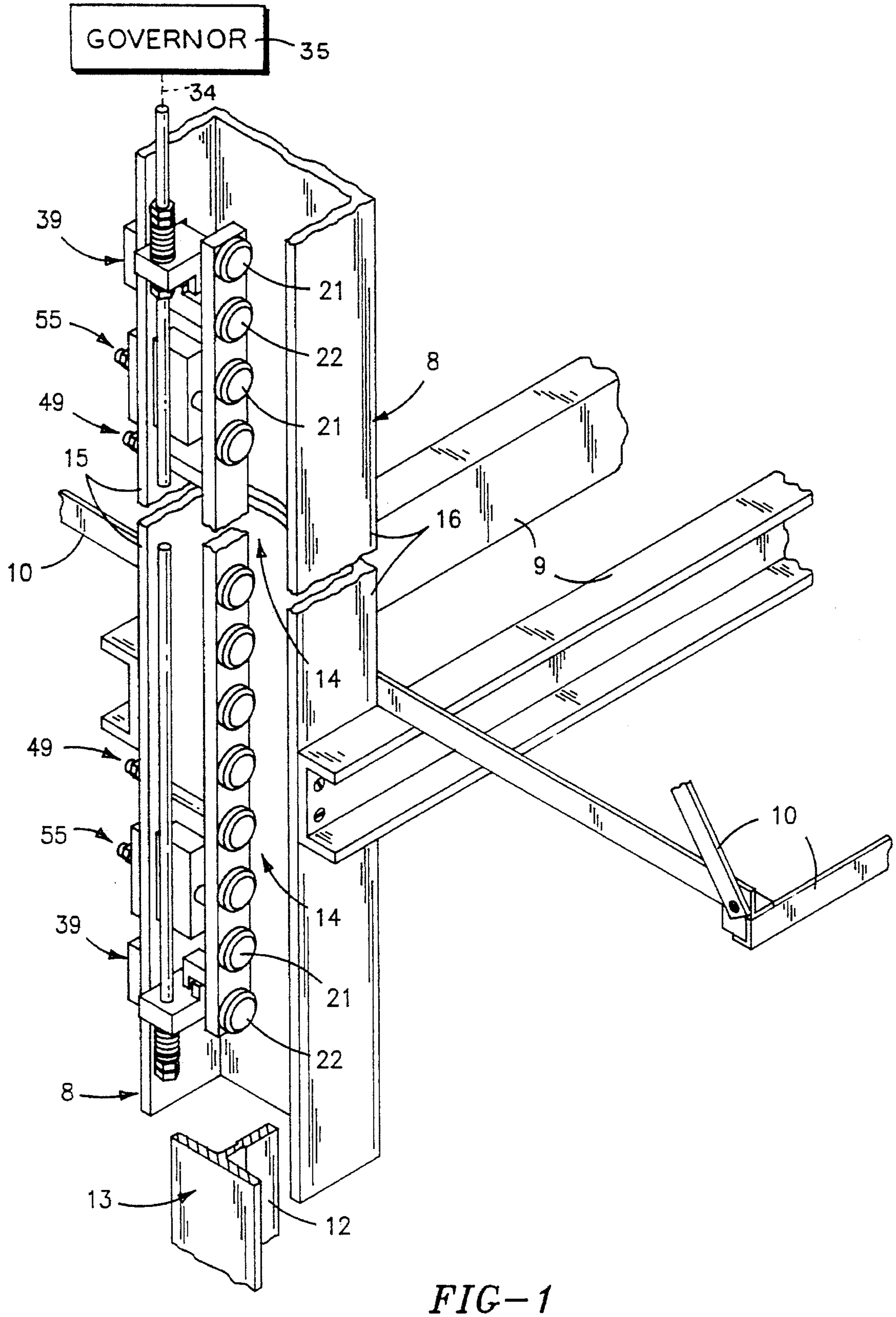
FIG. 1 is a partial, perspective, broken away view of an elevator car frame, an elevator guide rail, and a magnetodynamic safety brake according to the invention.

Referring now to FIG. 1, the frame of an elevator car includes a stile 8 on either side of the car. The stiles are joined together at the top by crosshead beams (not shown) and are joined at the bottom by safety plank beams 9. The safety plank beams 9 support a car platform frame 10, which in turn supports the platform and the car itself (not shown).

The stile 8 is a C-shaped beam that totally surrounds the stem or nose portion 12 of a T-shaped elevator guide rail 13. A magnetodynamic safety brake 14 of the present invention is built directly upon one lip 15 of the stile 8. Typically, a similar safety brake assembly 14 is disposed on a similar lip of a stile disposed at the opposite end of the safety plank beams 9. Additional safety brakes 14 may be disposed at the top of each of the stiles, and elsewhere as desired. In addition, although it is not necessary for brake action, a safety brake 14 could be disposed on the other lip 16 of the stile 8 for additional braking action. However, as is described more fully hereinafter, there is no need to pinch the stem 12, as in the case of prior safety brakes, so that the safety brakes of the invention may be mounted along the stiles in any position which may be desired, with or without safety brakes on opposite sides of the rail nose or stem 12.

Figure 2:
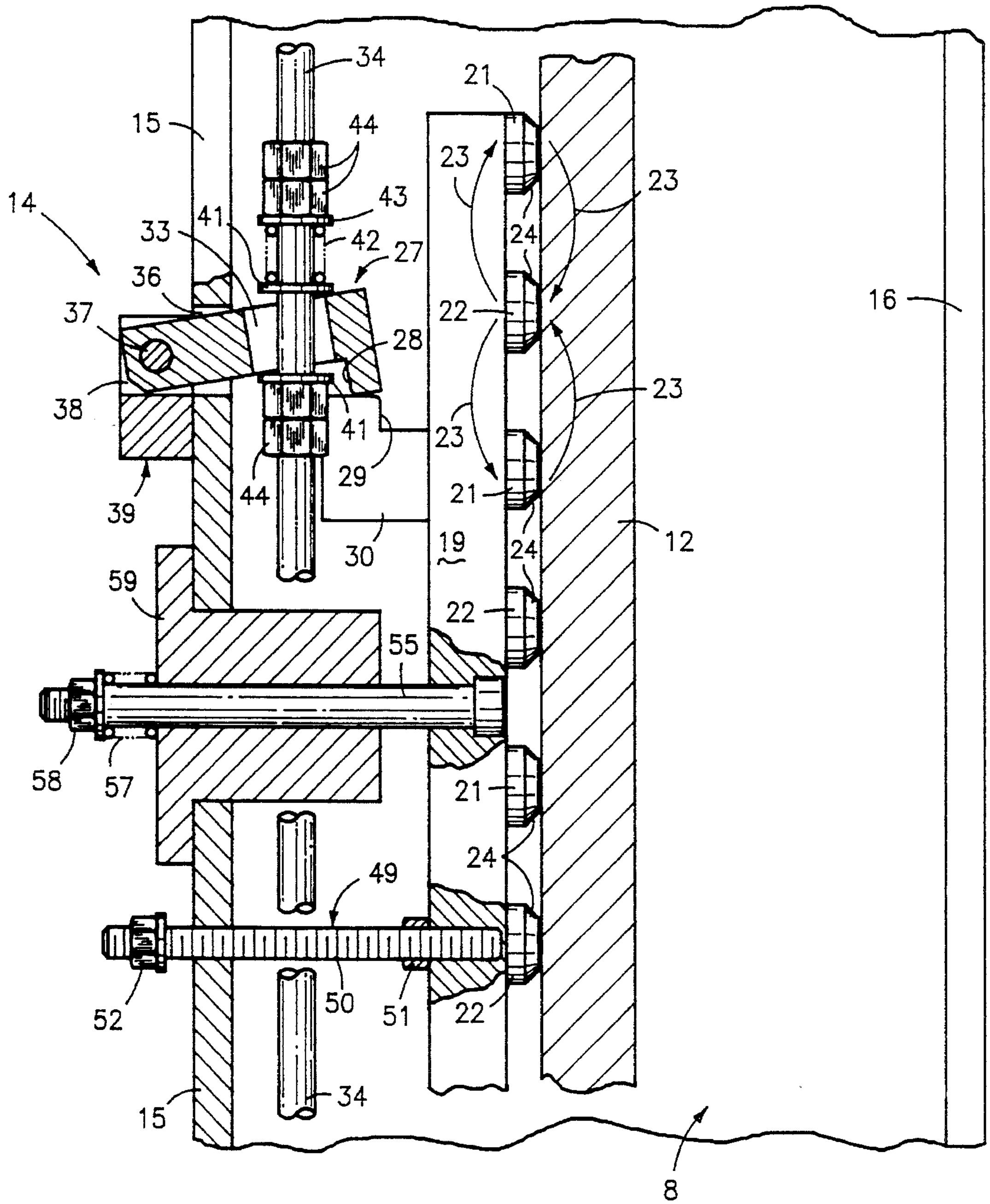
FIG. 2 is a partial, partially broken away, sectioned side elevation view of a magnetodynamic safety brake of the invention when in the operated, braking position.

Referring now to FIG. 2, the safety brake 14 of the invention is shown in its operated position in which it is providing braking action to the elevator car by virtue of the fact that it is in contact with the stem 12 of the elevator guide rail 13. A brake shoe consists of a plurality of magnetic poles disposed on a low reluctance, soft iron yoke 19, each pole including a plurality of permanent magnets 21, 22, the magnets 21 having a polar orientation of north to south (left to right in FIG. 2) while the magnets 22 have a polar orientation of south to north (left to right in FIG. 2), or vice-versa. By having alternate polar orientation, there will be magnetic flux within the yoke 19 as well as the rail stem 12, as shown by the arrows 23. The magnetic flux is guided from the yoke 19 to the rail stem 12 through soft iron pole tips 24, fastened with the magnets 21, 22 to the yoke 19 by screws or metallurgical bonding, so as to resist vertical forces and not increase the reluctance of the flux path. The pole tips act as flux concentrators; they need not be used if not needed. The magnets 21, 22 may comprise neodymium iron, which has high magnetic strength and medium cost, but is very temperature sensitive; samarium cobalt, which has high magnetic strength and is insensitive to temperature variations but is very expensive; barium ferrite, which is cheap but of low magnetic strength; or other known materials. The yoke 19 and pole tips 24 may be other magnetic materials.

Figure 3:
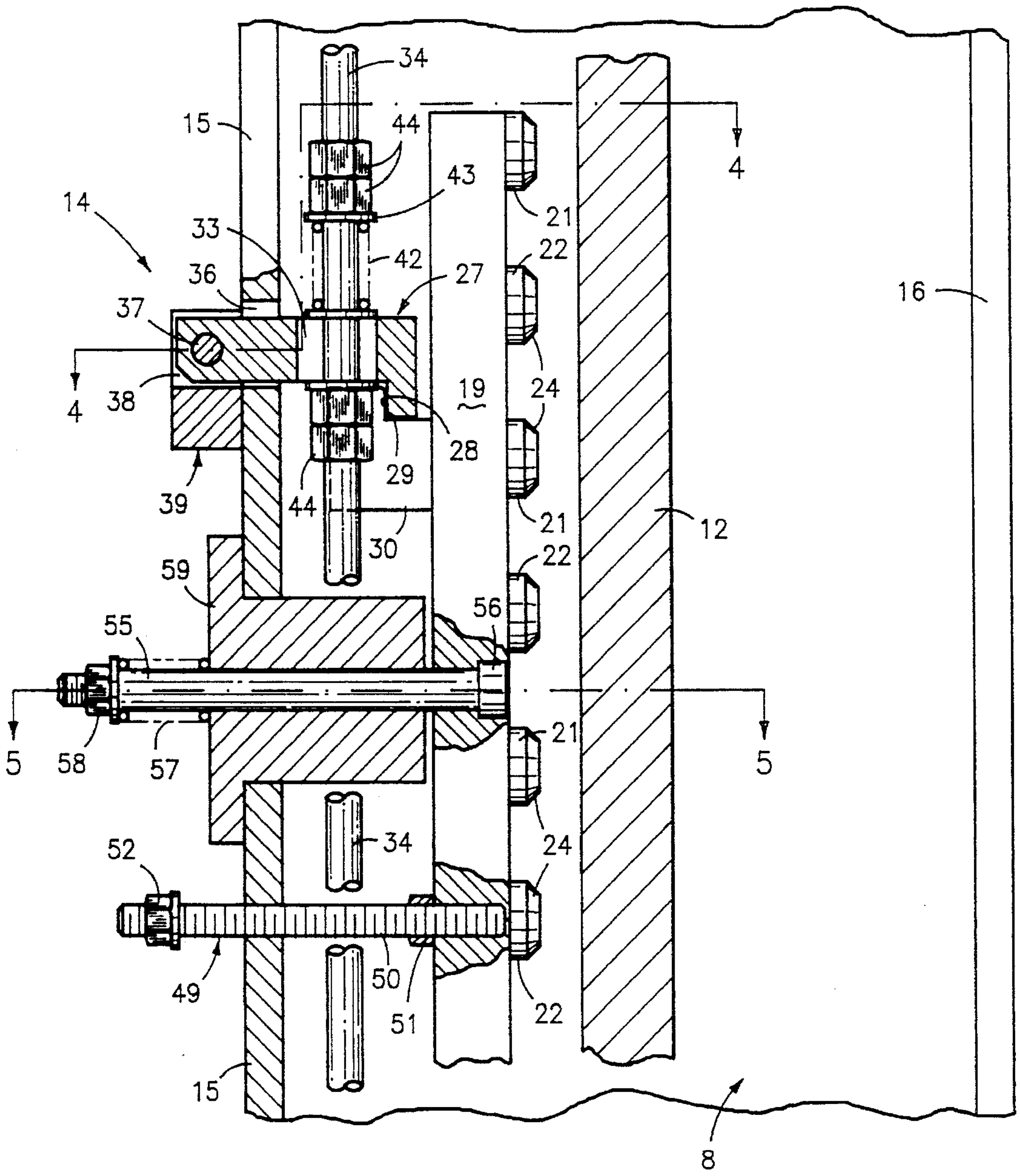
FIG. 3 is a partial, partially broken away, sectioned side elevation view of a magnetodynamic safety brake of the invention when reset in a lifted, inoperative position.

As shown in FIG. 3, the safety brake of the present invention is normally held away from the track stem 12 by a lift/release means which includes a pawl 27 having a lip 28 which engages a lip 29 on a latch 30 that is fastened to the yoke 19 in any suitable way (not shown), such as by machine screws or metallurgical bonding. The pawl 27 has an elongated hole 33 therein through which passes a safety rod 34 which is operated by a governor 35, (FIG. 1) together forming a safety brake engaging system in this embodiment.

Figure 4:
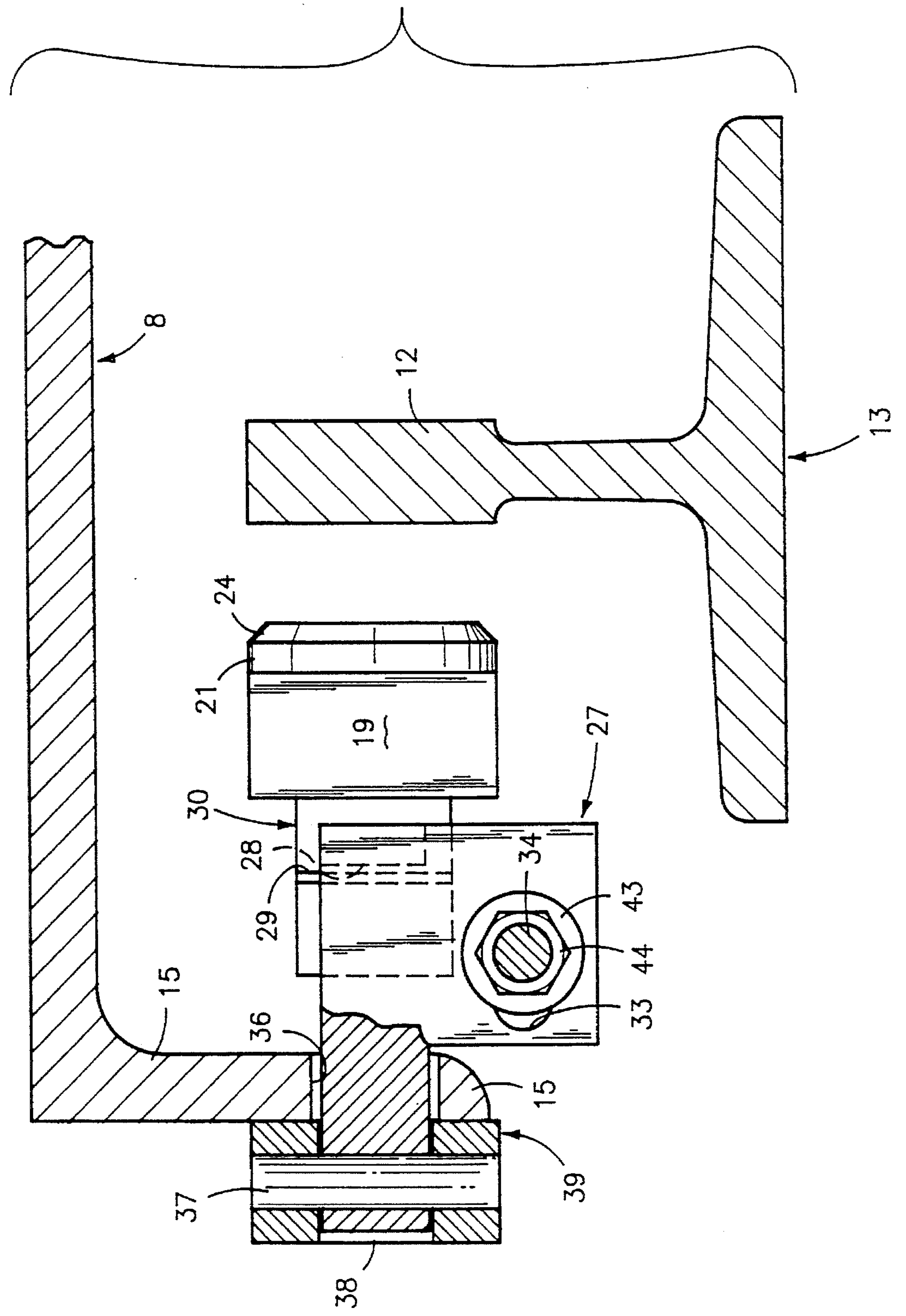
FIG. 4 is a partial, top sectional view taken on the line 4—4 of FIG. 3.

As seen in FIGS. 2–4, the pawl 27 passes through a clearance hole 36 in the lip 15 and is pivoted around a pin 37 which spans a notch 38 in a block 39 that is fastened in any suitable way (not shown), such as by means of screws or metallurgical bonding, to the lip 15 of the stile 8. The safety rod 34 has a pair of washers to engage the sides of the elongated hole 33, a spring 42, a washer 43 and lock nuts 44 to allow positioning of the pawl 27 as a function of the position of the safety rod 34. Comparing FIG. 3 with FIG. 2, raising the safety rod 34 rotates the pawl 27 counterclockwise so that lip 29 clears the lip 28, and magnetic attraction will cause the brake to engage.

Because of magnetic attraction, releasing the safety brake of the present invention from the braking position shown in FIG. 2, to restore it to the lifted position shown in FIG. 3, requires that considerable force be exerted on the brake so as to produce an air gap between the pole pieces 24 and the stem 12 of the elevator guide rail. For this purpose, a brake release mechanism comprises a jack screw 49 including a threaded rod 50 which engages mating threads in the yoke 19 and is secured thereto with a lock nut 51. Turning a nut 52 so that it advances to the right in FIG. 2 against the lip 15 will pull the yoke 19 to the left in FIG. 2, thereby causing the brake to be reset into the position shown in FIG. 3. After the safety rod is moved to allow the pawl lip 28 to engage the latch lip 29, the nut 52 can be backed off to the left as in FIG. 3 so as to be ready for instantaneous operation should the need arise again. When reset, the magnets 21, 22 should be spaced from the stem 12 sufficiently to reduce the eddy currents therein to an inconsequential, minimal level, so as not to provide drag to the normally-moving car.

Figure 5:
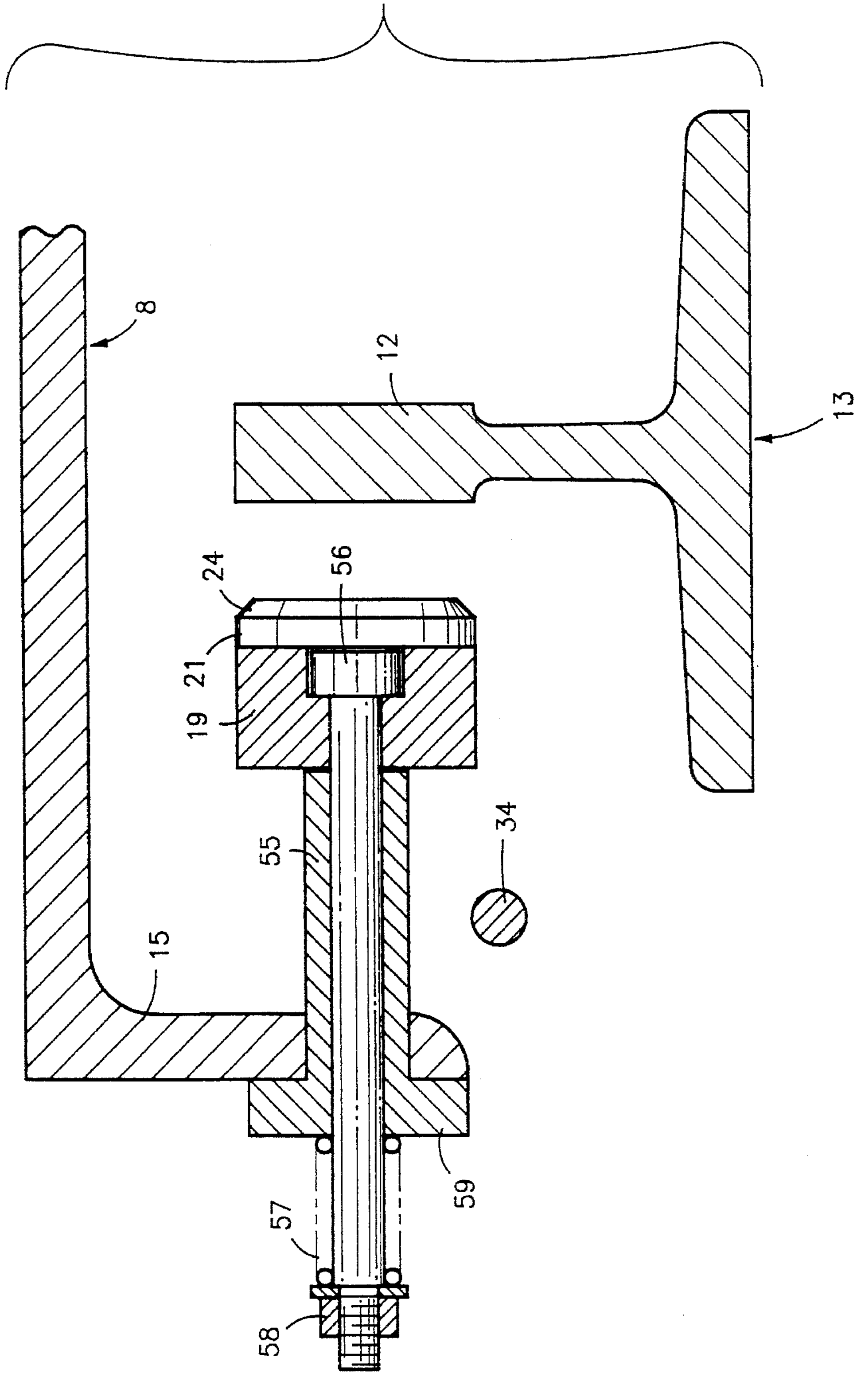
FIG. 5 is a top sectional view taken on the line 5—5 of FIG. 3.

As seen in FIGS. 2, 3 and 5, the yoke 19 is guided in its motion from left to right by means of a pin 55 which has a head 56 that is recessed into the yoke 19 and held secure thereto by means of a spring 57 operating against a nut 58. The pin 55 slides within a hole in a bushing block 59 that passes through a hole in the lip 15, which may be vertically elongated (as shown by comparing the view in FIGS. 2 and 3 with the view in FIG. 5). This provides vertical stability to the safety brake as it slides against the stem 12 of the guide rail 13 to provide braking action. For vertical stability, the present embodiment will include at least two guides, such as pins 55 (as shown in FIG. 1); however, more pins may be used for greater vertical stability. The brake may be guided and stabilized against the braking force by means of brackets mounted on the stile 15 above and below the brake, between which the yoke can slide, instead of or in addition to the pins; and other methods of stabilizing the safety brake may be used if desired.

As an example of the braking action which can be expected, assume that the flux density at the pole tips will be at least 1.5 Tesla. In soft iron, this will yield a magnetic pressure of 895 KPa, which equates to 130 Psi. To deliver 4,000 pounds of braking force, with a worse case coefficient of friction of 0.1 (in the case of an elevator safety brake, the coefficient of friction may approach 0.5), a normal force of 40,000 pounds would be required. At 130 psi, 40,000 pounds is achieved with 308 square inches of active brake area. If the contact surface of the pole tips 24 with the surface of the rail stem were 2 inches in width (the vertical dimension in FIGS. 4 and 5), then 154 lineal inches of mating surface would be required. If the spacing between the pole tips is the same as the vertical length of the pole tips 24, then 308 inches of safety brake (the total length of the yoke 19) would be required. This could be achieved with four separate safety brakes, disposed two on each side of the elevator car, each being 77 inches long (approximately 2 meters). The foregoing is an exemplary indication of the kind of purely frictional braking action that can occur. In the magnetodynamic brake of the present invention, considerable stopping force will be produced by eddy currents. In fact, in the aforementioned Knorr-Bremse pamphlet, it is reported that an abrasive eddy current brake (one with both magnetodynamic and frictional braking forces) will have essentially twice the braking force of a purely frictional magnetic track brake. Thus it can be seen that adequate car braking can be achieved, easily, with the present invention, even for elevators.

The present invention can be easily adapted for use with V-shaped rails and Y-shaped rails simply by tilting the direction of stroke (left to right as seen in FIGS. 4 and 5) at an angle so as to match the angular faces of such rails. This is a specific advantage of the invention: since it does not need to pinch the rail, it is easily applied to the sloped surfaces of such rails. Instead of the latch and pawl 30, 27, the lift/release means may employ electromagnets to hold the safety brake of the invention away from the rail during normal operation, loss of current to the electromagnets allowing the safety brake to be applied. In such a case, care must be taken to ensure that false tripping of the brake would be brought to an absolute minimum. Although the jack screw 49 is shown as a simple bolt and nut which must be turned by hand, it could obviously be an electrically driven screw jack. Other brake release mechanisms may be used to release the brake, such as levers of various types, and electromagnets. These variations are irrelevant to the present invention. The emergency brake 14 could, if desired, be built up on a frame separate from the lip 15.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A magnetodynamic safety brake, a safety brake engaging system and a car that travels along a magnetic, electrically conductive guide rail with a flat surface which may be engaged by the surface of said safety brake, said car having said safety brake engaging system for actuating said safety brake in the case of overspeeding of the car or other emergency, comprising:

an elongated yoke of low reluctance magnetic, electrically conductive material mounted on said car adjacent to and parallel with the flat surface of the guide rail;

a plurality of magnetic poles disposed on said yoke in spaced relationship, each including a permanent magnet, alternate ones of said permanent magnets being disposed with opposite polar orientation, thereby to provide loops of magnetic flux between adjacent ones of said magnetic poles;

lift/release means for holding said safety brake in a lifted position spaced away from the flat surface of the guide rail a sufficient distance so that eddy current forces between said magnetic poles and the guide rail are minimal and responsive to the safety brake engaging system of the car to cause said lift/release means to release said safety brake in response to the safety brake engaging system of the car reacting to a car emergency condition, and thereby allow said safety brake to be pulled toward the flat surface of the guide rail by attractive magnetic force, so that said magnetic poles contact the flat surface of the guide rail to provide frictional and magnetodynamic braking to the car.

2. A safety brake according to claim 1 including a brake release mechanism for providing force to said yoke, in a direction generally opposite to the direction in which said yoke is pulled toward the flat surface of the guide rail, sufficient to overcome the attractive magnetic force and return said safety brake to said lifted position.

3. A safety brake according to claim 2 wherein said brake release mechanism comprises a jack screw.

4. A safety brake according to claim 3 wherein said jack screw comprises a bolt and a nut.

5. A safety brake according to claim 1 wherein said magnetic poles include flux concentrating pole tips of low reluctance magnetic material disposed on said permanent magnets to provide the contact of said magnetic poles with the flat surface of the guide rail.

6. A safety brake according to claim 1 wherein said lift/release means comprises a latch having a lip engaged, when in the lifted position, by a lip of a rotatable pawl, and said pawl is rotated so that said lips disengage in response to the emergency brake engaging system of the car reacting to a car emergency condition.

7. A safety brake according to claim 1 including a guide for guiding the motion of said safety brake as it is pulled toward the flat surface of the guide rail and for stabilizing said safety brake against the braking forces imparted thereto by the guide rail.

8. A safety brake according to claim 1 wherein said permanent magnets comprise neodymium iron.

9. A safety brake according to claim 1 wherein said permanent magnets comprise samarium cobalt.

10. A safety brake according to claim 1 wherein said permanent magnets comprise barium ferrite.

11. A magnetodynamic safety brake and an elevator car traveling along magnetic, electrically conductive guide rails with a flat surface which may be engaged by the surface of the safety brake, said car having governor actuated safety rods for actuating said safety brake in the case of overspeeding of the car or other emergency, comprising:

an elongated yoke of low reluctance magnetic, electrically conductive material mounted on said elevator car adjacent to and parallel with the flat surface of one of said guide rails;

a plurality of magnetic poles disposed on said yoke in spaced relationship, each including a permanent magnet, alternate ones of said permanent magnets being disposed with opposite polar orientation, thereby to provide loops of magnetic flux between adjacent ones of said magnetic poles;

lift/release means for holding said safety brake in a lifted position spaced away from the flat surface of said one guide rail a sufficient distance so that eddy current forces between said magnetic poles and said one guide rail are minimal and responsive to one of said safety rods of the car to cause said lift/release means to release said safety brake in response to said one safety rod being pulled by the governor, and thereby allow said safety brake to be pulled toward the flat surface of said one guide rail by attractive magnetic force, so that said magnetic poles contact the flat surface of said one guide rail to provide frictional and magnetodynamic braking to the elevator car.

* * * * *